US008161017B2

(12) United States Patent
Hrle et al.

(10) Patent No.: US 8,161,017 B2
(45) Date of Patent: Apr. 17, 2012

(54) ENHANCED IDENTIFICATION OF RELEVANT DATABASE INDICES

(75) Inventors: Namik Hrle, Boeblingen (DE); Johannes Schuetzner, Boeblingen (DE); James Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/418,146

(22) Filed: Apr. 3, 2009

(65) Prior Publication Data

US 2010/0257152 A1 Oct. 7, 2010

(51) Int. Cl.
*G06F 7/00* (2006.01)
(52) U.S. Cl. .................. 707/703; 707/696; 707/607
(58) Field of Classification Search ......... 707/999.002, 707/696, 607, 703
See application file for complete search history.

(56) References Cited

U.S. PATENT DOCUMENTS

| | | | | |
|---|---|---|---|---|
| 5,404,510 | A * | 4/1995 | Smith et al. ............... | 1/1 |
| 5,504,894 | A * | 4/1996 | Ferguson et al. ........... | 1/1 |
| 5,842,197 | A * | 11/1998 | Ho ............................ | 1/1 |
| 6,513,029 | B1 * | 1/2003 | Agrawal et al. ........... | 1/1 |
| 6,934,701 | B1 * | 8/2005 | Hall, Jr. ..................... | 1/1 |
| 7,350,195 | B2 * | 3/2008 | Herbeck et al. ........... | 717/127 |
| 7,499,907 | B2 * | 3/2009 | Brown et al. .............. | 1/1 |
| 7,925,646 | B2 * | 4/2011 | Gao et al. .................. | 707/714 |
| 7,991,762 | B1 * | 8/2011 | Alpert et al. .............. | 707/709 |
| 2003/0158842 | A1 * | 8/2003 | Levy et al. ................. | 707/3 |
| 2004/0220947 | A1 * | 11/2004 | Aman et al. ............... | 707/100 |
| 2005/0066326 | A1 * | 3/2005 | Herbeck et al. ........... | 718/100 |
| 2005/0102305 | A1 * | 5/2005 | Chaudhuri et al. ........ | 707/101 |
| 2005/0125427 | A1 | 6/2005 | Dageville et al. | |
| 2005/0187917 | A1 * | 8/2005 | Lawande et al. .......... | 707/3 |
| 2005/0234900 | A1 * | 10/2005 | Bossman et al. .......... | 707/4 |
| 2006/0074977 | A1 * | 4/2006 | Kothuri et al. ............ | 707/104.1 |
| 2007/0083483 | A1 * | 4/2007 | Lawande ................... | 707/1 |
| 2007/0130107 | A1 * | 6/2007 | Waas et al. ................ | 707/2 |
| 2007/0136386 | A1 * | 6/2007 | Burger ...................... | 707/200 |
| 2008/0077932 | A1 * | 3/2008 | Ruppach et al. .......... | 718/105 |
| 2008/0235183 | A1 * | 9/2008 | Draese et al. ............. | 707/2 |
| 2010/0145977 | A1 * | 6/2010 | Brodfuehrer et al. ..... | 707/769 |
| 2010/0250504 | A1 * | 9/2010 | Balasubramanian et al. ......................... | 707/696 |

OTHER PUBLICATIONS

Chaudhuri et al., "Microsoft Index Tuning Wizard for SQL Server 7.0", ACM 1998, pp. 553-554.*
Sattler et al., "Autonomous Query-Driven Index Tuning", In the proceedings of the International Database Engineering and Applicaitons Symposium, 2004, 10 pages.*
Gibas et al., "Online Index Recommendations for High-Dimensional Databases Using Quey Workloads", IEEE Transactions on Knowledge and Data Engineering, vol. 20, No. 2, Feb. 2008, pp. 246-260.*
Deese, "Evaluating and Improving CICS Performance in MVC (Goal Model)", 1998, Computer Management Sciences, Inc., 13 pages, accessed online at <http://www.cpexpert.com/cics_wlm.pdf> on Nov. 21, 2011.*
Schroeder et al., "Achieving Class-based QoS for Transactional Workload", In Submission to ICDE'06, 12 pages.*

* cited by examiner

*Primary Examiner* — Hung T Vy
*Assistant Examiner* — Phuong Thao Cao
(74) *Attorney, Agent, or Firm* — Patterson & Sheridan, LLP

(57) ABSTRACT

According to one embodiment of the present invention, a method for identifying relevant database indexes is provided. According to one embodiment of the present invention, a method includes determining the importance of a particular database transaction and storing an index name related to the transaction along with an indicator of the importance. A database transaction is initiated and the importance indicator is received in an index advisor. The index advisor then makes an index recommendation based on the index importance.

24 Claims, 4 Drawing Sheets

ENHANCED IDENTIFICATION OF RELEVANT DATABASE INDICES

BACKGROUND

The present invention relates to relational database systems, and more specifically, to identifying relevant database indexes in database transactions.

Relational database systems generally store data in sets of tables. Structured Query Language (SQL) queries are issued against the tables to obtain information from the database. SQL is a declarative language that only specifies what data is to be retrieved and does not specify how to retrieve it. The database query optimizer is the component of a database system that determines the strategy for how the data requested by the query should be retrieved, which is called the query execution plan. Database systems typically use a cost-based query optimizer, which determines the possible execution plans, assigns a cost value to each plan, and chooses the one with the least cost. This cost is a measure of the resources, such as CPU, IO and memory required to execute the query using the given plan. The lower the cost, the faster the query would execute.

Database systems use indexes to speed up the processing of queries. Without indexes or other mechanisms to accelerate the retrieval of certain data, the database system would need to scan complete tables to identify the table records that satisfy the predicates of a query. Depending on the table size, this approach could take a very long time. Therefore, one or more indexes are almost always defined on tables. There is usually one primary index that ensures uniqueness of the table records and multiple secondary indexes that are defined according to the queries that are executed on a table.

A downside of indexes is that when data records are inserted, updated or deleted in a table, the affected index trees need to be maintained accordingly, which consumes CPU cycles and potentially requires I/O activity. Therefore, to optimize the performance of SQL INSERT, UPDATE and DELETE statements, it would be best to have as few indexes as possible.

There should be a reasonable trade-off between having many indexes for a good performance of queries and having few indexes for a good performance of insert, update and delete. A database component called an index advisor (also called database design advisor) may be used to provide recommendations for table indexes based on a set of SQL statements on tables.

SUMMARY

According to one embodiment of the present invention, a method comprises: determining the importance of a particular database transaction; storing index names related to the transaction along with an indicator of the importance; initiating a database transaction; receiving the importance indicator in an index advisor; and making an index recommendation based on the index importance using the index advisor.

According to another embodiment of the present invention, a method comprises: starting a database transaction; assigning a service class to the database transaction; determining an importance of the database transaction based at least in part on the service class; assigning and storing the importance to an index used in the database transaction; reading the stored importance in an index advisor; and making an index recommendation using the index advisor based at least in part on the stored importance.

According to a further embodiment of the present invention, a system comprises: a database having a table stored with index importance values; an application for executing database transactions involving the database; and an index adviser connected to the database and using the stored index importance in making index recommendations. According to another embodiment of the present invention, a computer program product for identifying relevant database indexes comprises: a computer usable medium having computer usable program code embodied therewith, the computer usable program code comprising: computer usable program code configured to: determine the importance of a particular database transaction; store index names related to the transaction along with an indicator of the importance; initiate a database transaction; receive the importance indicator in an index advisor; and make an index recommendation based on the index importance using the index advisor.

DETAILED DESCRIPTION

Figure 1:
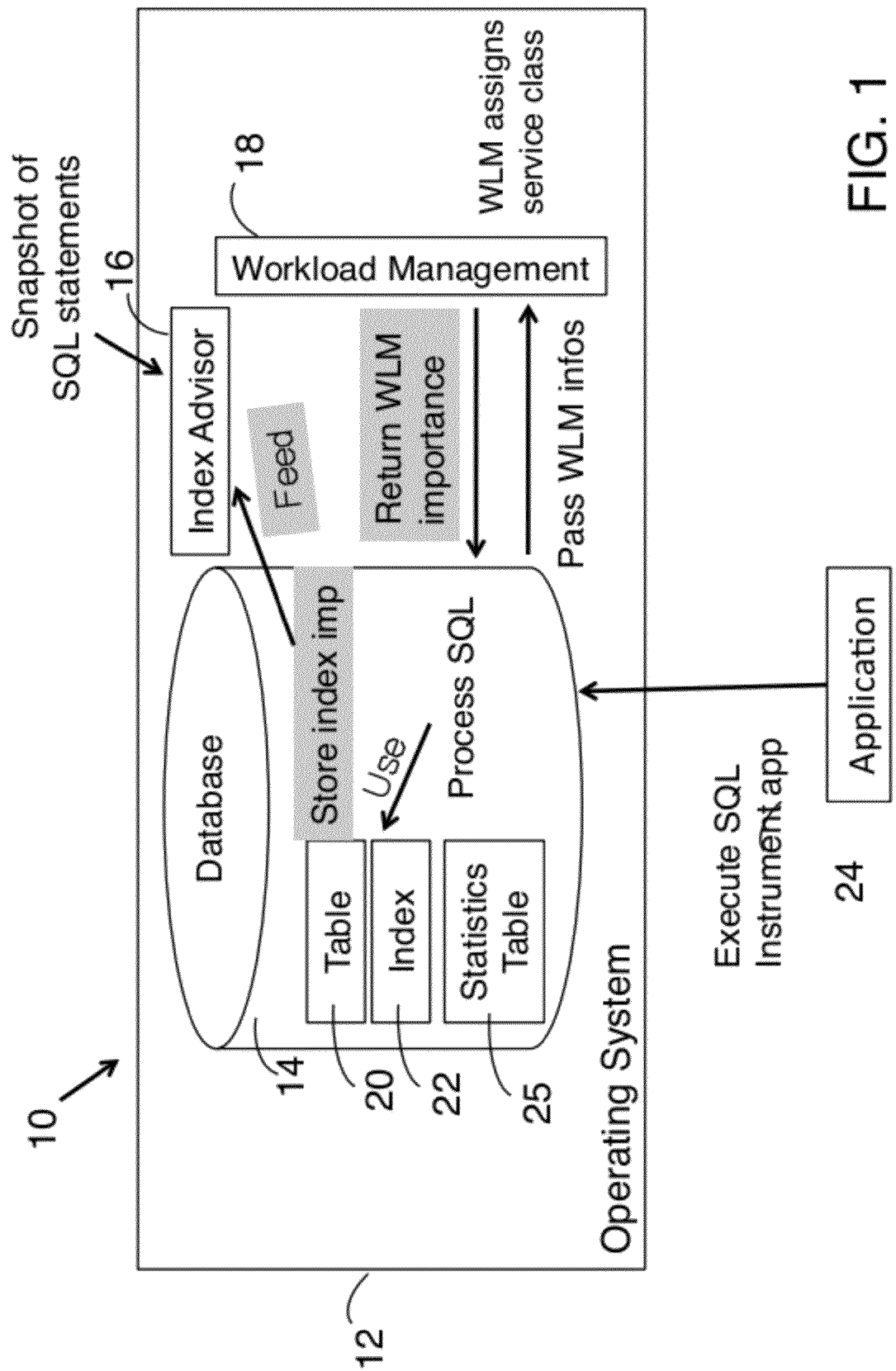
FIG. 1 shows a diagram of a database system in accordance with an embodiment of the invention.

Embodiments of the invention provide techniques for enhanced identification of relevant database indexes. Prior systems, such as the above-described index advisors usually take a representative snapshot of SQL statements and optimize the set of indexes for these statements. Statements that are executed at other times may not be properly taken into account. Existing approaches consider the number of executions, the amount of resource consumed by statements, or the data of the last usage of an index. This enables index advisors to favor indexing statements that contribute more to the overall workload. However, these approaches do not take into account the relevance of transactions in which queries are executed. Some transactions may be executed only infrequently. However, if these transactions are crucial for the overall performance of solutions, indexes supporting the queries of these transactions need to be available. This is also the reason why some applications define a standard set of indexes that may contain indexes only beneficial for future statements. If such indexes already exist, they should not be dropped. Therefore, existing approaches accomplish a suboptimization only, which does not take into account the business value of database transactions.

Computers today process different types of work with different completion and resource requirements. Every installation wants to make the best use of its resources and maintain the highest possible throughput and achieve the best possible system responsiveness. Workload management makes this possible. With workload management, system programmers define performance goals and assign a business importance to each goal. They define the goals for work in business terms, and the system decides how much resource, such as CPU and storage, should be given to it to meet the goal. Workload management will constantly monitor the system and adapt processing to meet the goals.

The performance goals and business importance are typically defined based on service policies and classification rules. The classification rules allow the workload management system to automatically assign a service class to new incoming work. A service class is a named group of work within a workload with similar performance characteristics. For example, incoming work with the same performance goals, resource requirements, business importance to the installation, etc., may be part of the same service class.

Embodiments of the invention generally not only exploit database performance metrics to decide about index design, but have a holistic approach that also takes the business value of indexes into account. More specifically, these embodiments define additional criteria for deciding if an index should be created or can be dropped. This additional criterion is the importance of an index. An index is more relevant if it is used in transactions that have a higher importance.

Transactions that have higher importance are marked as such by using tools such as the IBM Workload Manager (WLM). Embodiments of the invention take the information from the WLM and update index usage statistics. In some embodiments, the index usage statistics is kept in real-time statistics tables. Once an index gets rated on relevance, index advisor tools have a better chance to come up with more business relevant advice for acting upon the index.

In general, in embodiments of the invention, the importance of transactions, which is inherited to the indexes used in transactions, is taken into consideration by index advisor tools when recommending the best set of indexes for SQL workload. In particular, in some embodiments, the importance of indexes is used when index advisors decide whether an index that has not been used for a long time should be kept or dropped. The importance of an index may be derived as follows: when a database transaction is started, the workload management system passes an importance value to the database engine. This importance value is based on the importance of the service class assigned to the transaction. The database engine uses this information to update the importance of affected indexes.

An advantage of this approach is that index advisors can better take SQL workload into account that have a high importance for the customer even though they may be executed only infrequently. In particular, the present invention prevents dropping indexes that have not been used for a very long time but that are important in a future transaction. As a result, indexes can be recommended that better reflect the nature of business transactions. The flow of SQL statements is better utilized because the set of indexes is not optimized for a static snapshot of SQL statements.

FIG. 1 shows a database system 10, which may comprise a relational database management system such as DB2. The database system 10 runs in an operating system 12, which is coupled to a database 14, an index advisor 16 and a workload management system 18. The database 14 may include a table 20 and an index 22. The operating system is coupled to an application 24 that may run remotely in another operating system or locally. The workload management system 18 not only assigns a service class to a database transaction, but also returns the importance that is associated with the service class to the database system 10. The database system 10 remembers the importance that has been assigned to the currently executing transaction and stores this importance for every index used in the transaction. In one embodiment this is stored in a real-time statistics table for the index 25. This importance is then fed into the index advisor 16, which honors this importance when recommending indexes. This is particularly beneficial when deciding whether an existing index should be dropped.

Figure 2:
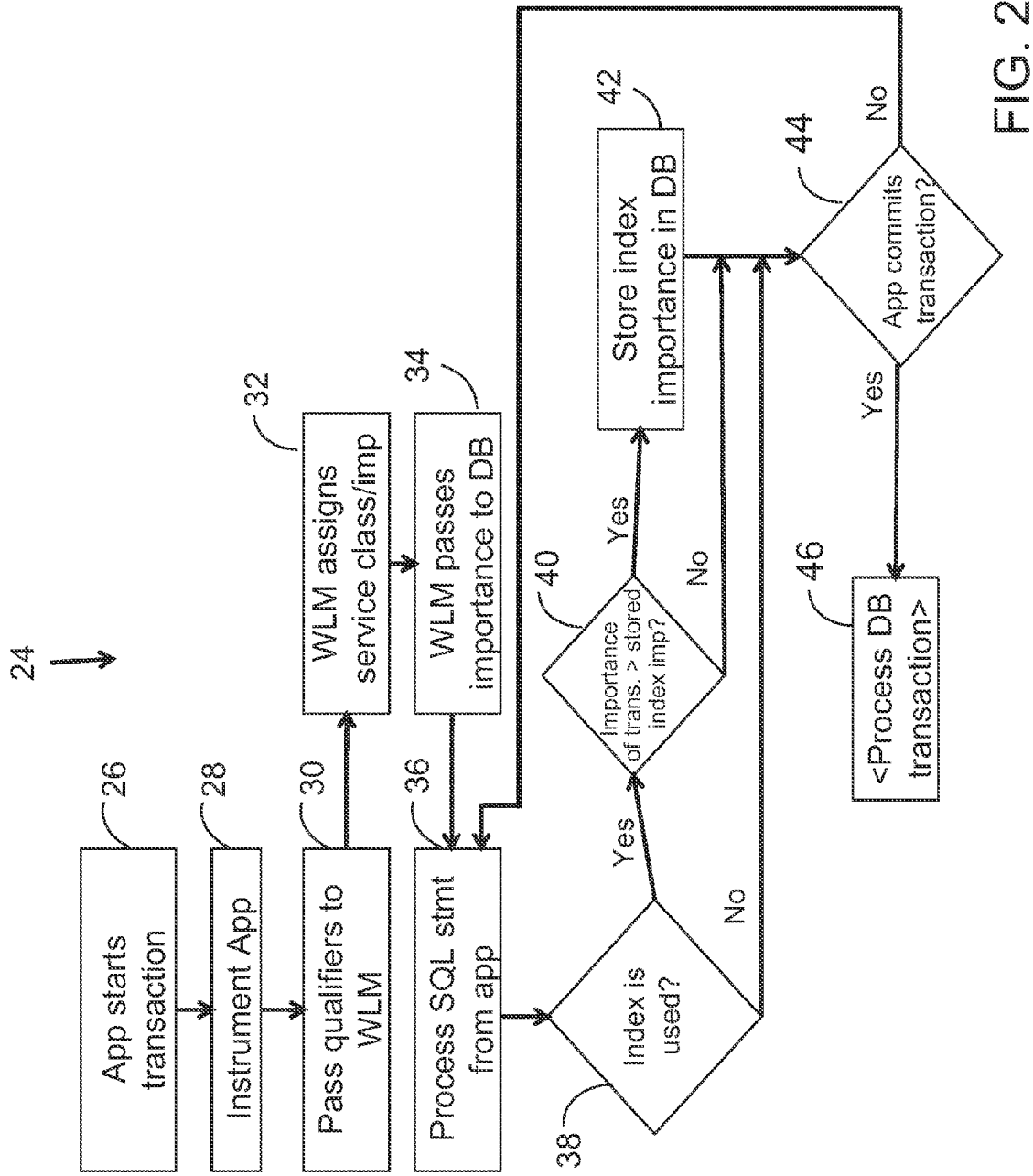
FIG. 2 shows a flowchart for processing a database transaction in accordance with an embodiment of the invention.
Figure 3:
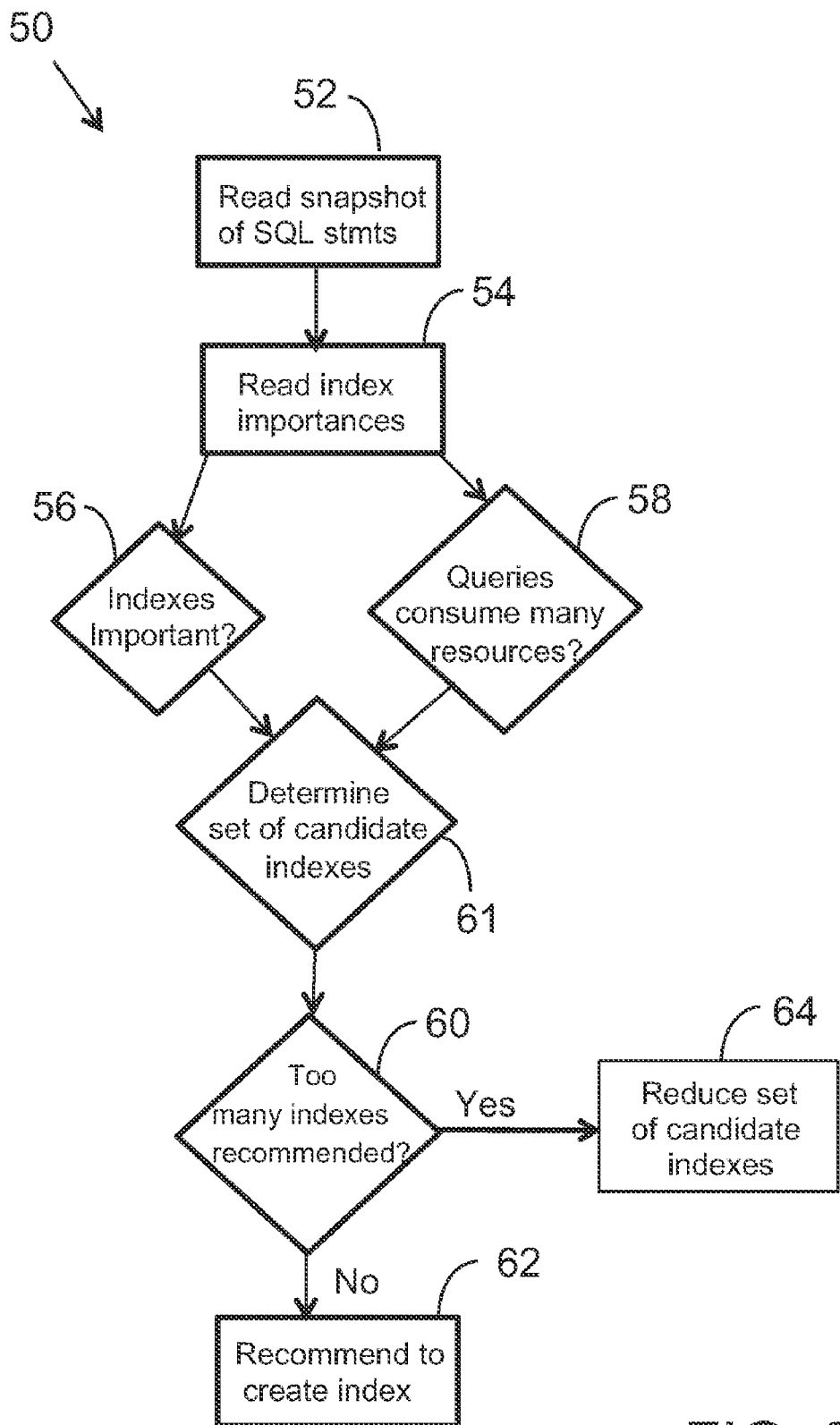
FIG. 3 shows a process for using an index advisor for making index recommendations during a database transaction in accordance with an embodiment of the invention.

FIGS. 2 and 3 are flowcharts showing the operation of one embodiment of the invention. FIG. 2 shows a process 24 for a database transaction. In block 26, the application 24 starts to process the transaction. This transaction may be, for example, the processing of an SQL query. In block 28, the application is instrumented. This may include, for example, the name of the application, the name of the end user, and/or the name of the batch job. Next, the database system 10 passes these qualifiers to a workload management system 18, as shown in block 30. The workload management system assigns a service class to the database transaction, in block 32, and also returns the importance that is associated with the service class to the database system 10, in block 34. In block 36, the database system 10 processes the SQL statement from the application 24. In block 38, the database system 10 checks whether an index is used for processing an SQL statement. If not, the database system 10 checks whether the application commits this transaction, in block 44. If so, the process moves to the next transaction, in block 46. If not, the process executes the next statement, by returning to block 36.

If an index is used, as determined in block 38, then block 40 checks to determine whether the importance of the transaction is higher then the importance so far stored for the index. If so, the process updates this information with the importance of the currently executing database transaction in clock 42. In one embodiment, the importance information for every index is stored in existing real-time statistics tables 25.

FIG. 3 shows a process 50 for an index advisor 16 in accordance with an embodiment of the invention. The index advisor 16 reads a snapshot of SQL statements, in block 52. In block 54, the process reads the index importance information from the database 14. Hence, in addition to the SQL snapshot information from block 52, there may be additional indexes considered for index recommendations. Block 56 determines if an index is important, while block 58 determines if an index or query consumes too many resources according to existing formulae. If either block 56 or 58 is affirmative, the index advisor determines a set of candidate indexes, in block 61.

In block 60, this set of candidate indexes is used to check whether there are too many indexes recommended for a table. If so, the set of candidate indexes is reduced in block 64. However, the importance of indexes is still taken into consideration in this step. Therefore, a crucial index that is very seldom used can still remain part of the final set of indexes that the index advisor recommends. If there are not too many indexes, block 62 will make the recommendation to create a new index.

As can be seen from the above disclosure, embodiments of the invention provide ways to identify relevant database indexes. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More examples of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, and/or RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
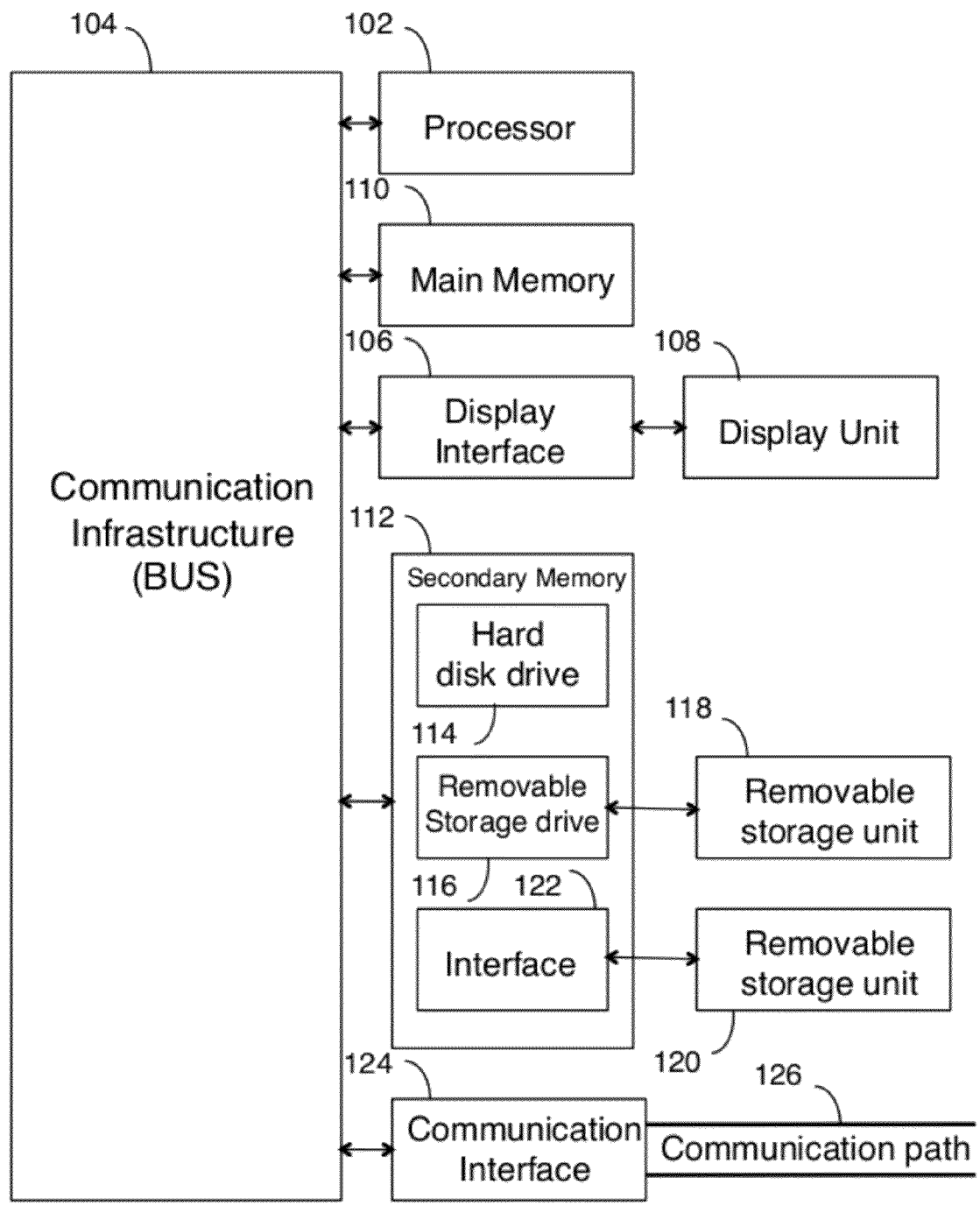
FIG. 4 shows a high level block diagram of an information processing system useful for implementing one embodiment of the present invention.

FIG. 4 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    initiating a database transaction;
    determining an importance of said database transaction;
    for at least a first index used in said database transaction:
        determining that said importance of said database transaction is higher than an importance currently stored for the first index,
        storing for the first index said importance of said database transaction, and
        sending said importance stored for the first index to an index advisor; and
    by operation of one or more computer processors executing program code, making an index recommendation based at least in part on said importance stored for at least said first index using said index advisor.

2. The method according to claim 1, further comprising:
    upon determining that a number of indexes included in said index recommendation exceeds a threshold, reducing the number of indexes.

3. The method according to claim 1, wherein determining an importance of said database transaction comprises using a workload management system.

4. The method according to claim 3, wherein determining an importance of said database transaction comprises updating usage statistics using said workload management system.

5. The method according to claim 1, further comprising maintaining index usage statistics in real-time statistics tables.

6. The method according to claim 1, wherein said database transaction is an SQL transaction.

7. The method according to claim 1, wherein said importance of said database transaction is based on at least one of the following characteristics of said database transaction: performance goals, resource requirements, and business importance.

8. A method comprising:
    initiating a database transaction;
    assigning a service class to said database transaction;
    determining an importance of said database transaction based at least in part on said service class;
    assigning said importance to at least a first index used in said database transaction; wherein said assigning said importance comprises:
        determining that said importance is higher than an importance currently stored for the first index;
        storing for the first index said importance of said database transaction;
        reading said stored importance for the first index in an index advisor;
        making an index recommendation using said index advisor based at least in part on said stored importance; and
        upon determining that a number of indexes included in said index recommendation exceeds a threshold, reducing the number of indexes.

9. The method according to claim 8, wherein said database transaction includes processing an SQL statement.

10. The method according to claim 8, wherein a workload management system assigns said service class and said importance to said database transaction.

11. The method according to claim 8, wherein said importance is based on at least one of the following characteristics of said database transaction: performance goals, resource requirements, and business importance.

12. The method according to claim 8, wherein making an index recommendation using said index advisor comprises reading and using a snapshot of SQL statements.

13. A system comprising:
a processor; and
a memory including a program, which, when executed by the processor, is configured to perform an operation comprising:
initiating a database transaction;
determining an importance of said database transaction;
for at least a first index used in said database transaction:
determining that said importance of said database transaction is higher than an importance currently stored for the first index,
storing for the first index said importance of said database transaction, and
sending said importance stored for the first index to an index advisor; and
making an index recommendation based at least in part on said importance stored for at least said first index.

14. The system according to claim 13, wherein determining an importance of said database transaction comprises using a workload management system.

15. The system according to claim 13, wherein making an index recommendation using said index advisor comprises reading and using a snapshot of SQL statements.

16. The system according to claim 13, wherein said database transaction is an SQL transaction.

17. The system according to claim 13, wherein said importance of said database transaction is based on at least one of the following characteristics of said database transaction: performance goals, resource requirements, and business importance.

18. The system according to claim 13, further comprising:
upon determining that a number of indexes included in said index recommendation exceeds a threshold, reducing the number of indexes.

19. A computer program product for identifying relevant database indexes, said computer program product comprising:
a computer usable storage medium having computer usable program code embodied therewith, said computer usable program code configured to:
initiate a database transaction;
determine an importance of said database transaction;
for at least a first index used in said database transaction:
determine that said importance of said database transaction is higher than an importance currently stored for the first index,
store for the first index said importance of said database transaction, and
send said importance stored for the first index to an index advisor; and
by operation of one or more computer processors executing the computer usable program code, make an index recommendation based at least in part on said importance stored for at least said first index.

20. The computer program product according to claim 19, further comprising:
upon determining that a number of indexes included in said index recommendation exceeds a threshold, reducing the number of indexes.

21. The computer program product according to claim 19, wherein said computer usable program code is further configured to use a workload management system to determine said importance of said database transaction.

22. The computer program product according to claim 21, wherein said computer usable program code is further configured to update usage statistics using said workload management system to determine said importance of said database transaction.

23. The computer program product according to claim 19, wherein said computer usable program code is further configured to maintain index usage statistics in real-time statistics tables.

24. The computer program product according to claim 19, wherein said database transaction is an SQL transaction.

* * * * *